Dec. 17, 1963

R. H. WILMER 3,114,584

TELEPHONE WIRING SUPPORT FOR DESKS

Original Filed May 16, 1960

INVENTOR

R. H. WILMER

BY [signature]

ATTORNEY 3,114,584

TELEPHONE WIRING SUPPORT FOR DESKS

Rudolph H. Wilmer, Youngstown, Ohio, assignor to The General Fireproofing Company, Youngstown, Ohio, a corporation of Ohio Original application May 16, 1960, Ser. No. 29,232, now Patent No. 3,043,643, dated July 10, 1962. Divided and this application Apr. 6, 1962, Ser. No. 186,829
1 Claim. (Cl. 312—194)

This invention relates to an improvement in telephone wire accessories for desks and more particularly to supports arranged to removably mount a terminal block to a fixed portion of the desk, preferably, for example, in the hooded or concealed area of the knee space of a double or single pedestal desk, and is a division of Patent No. 3,043,643 issued July 10, 1962.

Office buildings as now constructed usually provide appropriate telephone wiring outlets near the planned location of the desks. The purpose of this arrangement is not only to reduce the amount of labor and time required of a telephone installer, but also to avoid exposing unnecessary and annoying length of lead cord, and in addition to provide convenience to the user of the desk.

While it has long been the practice to provide knockout hole areas in a side wall of a desk pedestal through which telephone wires, light wires, or the like can be passed, nevertheless, it is particularly desirable that the desk itself at the time it is manufactured be so constructed as to support a wood or similar terminal block which may be readily removed to facilitate attachment of the necessary wires and then readily replaced as a part of the final step in connecting the usual telephone cord leading to the telephone instrument iself.

Accordingly, the object of the present invention is to provide suitable supports for the block which may be conveniently mounted on a fixed wall of the relatively enclosed knee space area of the desk, adjacent the modesty panel, but in no way connected thereto, so that when this panel is disconnected and removed by a simple operation, the wiring block will be readily accessible. The supports for the block may be disposed vertically or horizontally on a double pedestal desk, but, in their horizontal position, when there is no modesty panel as on a single pedestal desk, they are especially useful. In any event, they are immovably secured to a permanent wall portion forming the knee space enclosure.

With the above and other objects in view which will appear as the nature of the invention is better understood, the invention consists in the novel construction, combination, and arrangement of parts, hereinafter more fully described, illustrated and claimed.

A preferred and practical embodiment of the invention is shown in the accompanying drawings, in which.

Similar reference characters designate corresponding parts throughout the several figures of the drawings.

Figure 1:
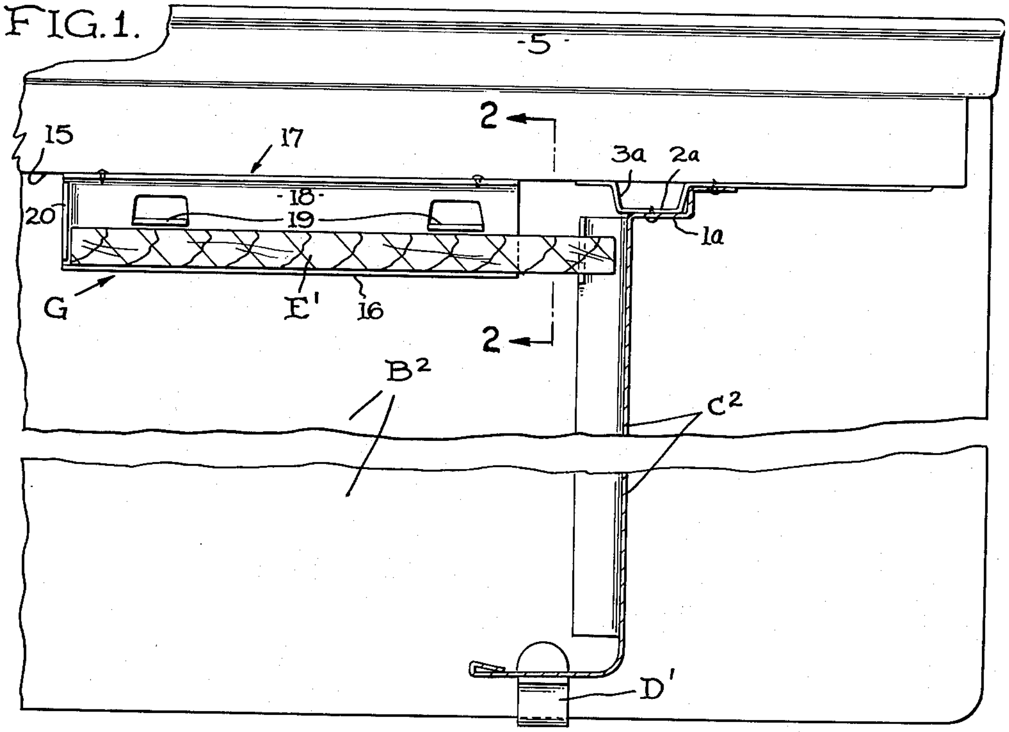
FIGURE 1 is a vertical sectional view taken on the line 1—1 of FIGURE 2 wherein the board or block is mounted for sliding movement on horizontal supports.
Figure 2:
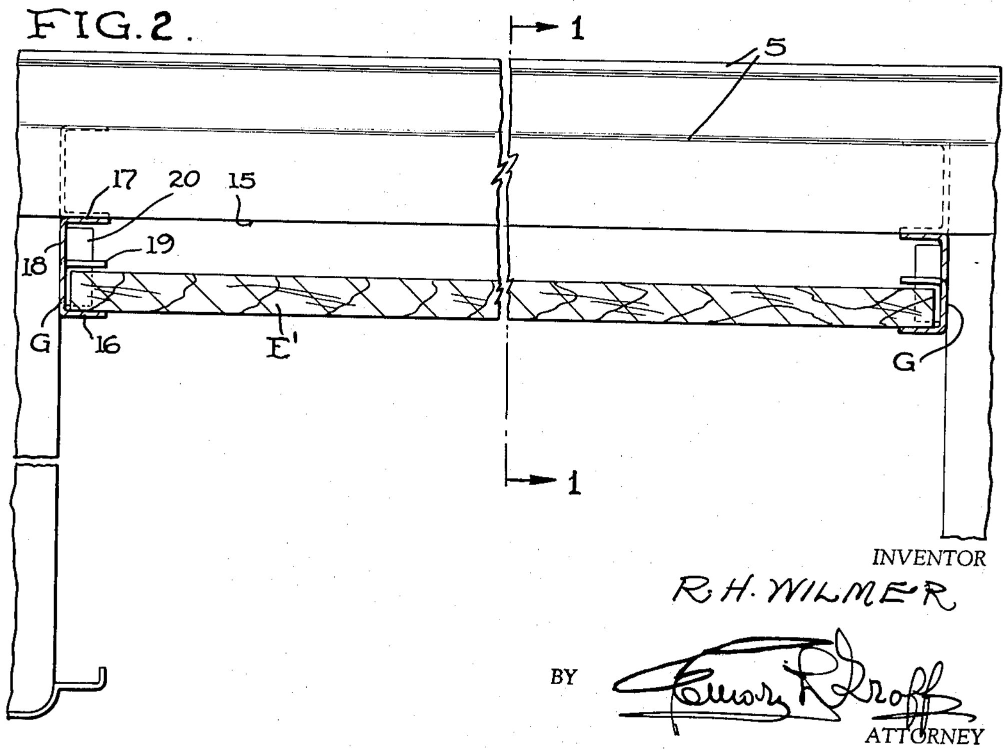
FIGURE 2 is a vertical sectional view taken on the line 2—2 of FIGURE 1.

Referring to FIGURES 1 and 2, the modesty panel $C^2$ has its upper flange $1^a$ detachably secured by fastenings $2^a$ to the structural member $3^a$ while its lower flanged end is slotted to receive the upturned end of the brackets D′.

The horizontal supports G are supported adjacent the side walls $B^2$ of the pedestal, below the dust wall 15 of the drawer space. As shown in FIGURES 6 and 7, the said supports G are provided with a bottom flange 16, a top flange 17 which is secured to the underside of wall 15 of the desk top, while the web 18 of the support is medially struck out to provide the inturned guide tongues 19. Therefore, it will be seen that the terminal block E′ has its opposite edges slidably fitted between flanges 16 and the inturned holding tongues 19. This arrangement may also be used to provide two levels for the block E′.

It will also be observed that one end of the web 18, that is the end which would be facing the user of the desk, is provided with an inwardly offset integral angularly disposed abutment flange 20 which will limit the inward horizontal sliding movement of the terminal block E′.

When it is desired to mount the instrument on block E′, the knee space panel $C^2$ is removed and the terminal block is slid forwardly and outwardly. The equipment is attached, and the block will be slid back into place, and the modesty panel restored to its normal position.

I claim:

A telephone wiring support for desks having a top overlying a knee space defined by opposite vertical pedestal walls closed at one side by a removable and replaceable modesty panel, comprising, a pair of inwardly facing channel members having spaced upper and lower flanges, said upper flanges attached to the under-portion of the top and their web portions facing outwardly from the pedestal walls, spaced tongues struck out medially from the webs of each channel and parallel to said flanges to provide therewith upper and lower horizontal guide-ways between said upper and lower flanges, an abutment struck inwardly from the end of each channel member and closing the ends of said channels remote from the modesty panel, and a wiring supporting block slidable between said tongues and the related flange of the channel toward said abutment when the modesty panel is removed.

References Cited in the file of this patent

UNITED STATES PATENTS

| | | |
|---|---|---|
| 1,786,823 | Carrington | Dec. 30, 1930 |
| 1,821,674 | Shapiro | Sept. 1, 1931 |
| 1,892,415 | Ulrich | Dec. 27, 1932 |
| 2,210,721 | Jones | Aug. 6, 1940 |
| 2,853,351 | Bassett | Sept. 23, 1958 |

FOREIGN PATENTS

| | | |
|---|---|---|
| 585,266 | Great Britain | Feb. 4, 1947 |